United States Patent [19]
Baur et al.

[11] Patent Number: 5,683,213
[45] Date of Patent: Nov. 4, 1997

[54] LOADING FIXTURE

[75] Inventors: Kenneth C. Baur, Mohnton; Kathleen M. Scholz, Shillington; William L. Whary, Mohnton; Rand Henry, Nottingham, all of Pa.

[73] Assignee: High Concrete Structures, Inc.

[21] Appl. No.: 639,783

[22] Filed: Apr. 29, 1996

[51] Int. Cl.$^6$ ........................................ B60P 7/08
[52] U.S. Cl. ........................ 410/44; 410/156; 280/405.1
[58] Field of Search ............................ 410/44, 45, 156; 280/405.1

[56] References Cited

U.S. PATENT DOCUMENTS

| | | | |
|---|---|---|---|
| 2,725,241 | 11/1955 | Leonard, Jr. | 410/44 |
| 2,903,274 | 9/1959 | Leonard, Jr. | 410/44 |
| 3,655,218 | 4/1972 | Taylor | 410/44 |

*Primary Examiner*—William E. Terrell
*Assistant Examiner*—Gregory A. Morse
*Attorney, Agent, or Firm*—Duane, Morris & Heckscher

[57] ABSTRACT

Hauling vehicles, fixtures and methods for loading heavy cargo are provided by this invention. The fixture enables such cargo to be loaded on a trailer, boat or railway with a minimum "effective width". Such fixtures include a support frame and an arm swivelly mounted to the support frame for enabling the cargo to be tilted from a first loading position to a second transporting position to reduce the degree to which the cargo extends beyond the width of the trailer. Transportation costs are significantly reduced through the use of this invention.

14 Claims, 2 Drawing Sheets

LOADING FIXTURE

FIELD OF INVENTION

This invention relates to fixtures for restraining large bulky objects for transport over land, rail or waterways, and in particular to fixtures that can reduce the effective width of bulky loads so as to minimize travel restrictions.

BACKGROUND OF THE INVENTION

Prefabricated assemblies have become increasingly popular in the construction trade. Such assemblies can include precast concrete structures, frame supports or even manufactured homes. The transport of these assemblies is highly regulated by the states. Transporting over-sized loads involves speed and weight restrictions, frequent escorting by warning vehicles and high tariffs. Over-width vehicles may be completely barred from entering narrow roadways, bridges or tunnels during certain hours of the day. Such additional detours and delays can increase the cost of transportation of such items by hundreds of dollars and can postpone the timing of delivery to the construction site. Since construction workers often begin their day at a set time every morning, delivery delays can further increase labor costs to contractors as workers wait idly for essential building materials.

SUMMARY OF THE INVENTION

This invention provides fixtures for use in hauling vehicles for transporting large, bulky cargo over a surface of a road, railroad bed or waterway. The fixture includes a support frame and an arm swivelly mounted to the support frame. The arm is disposed to contact the cargo and rotate it from a first loading position to a second transporting position. The first loading position can be horizontal, for example, for facilitating the loading of such cargo onto the fixture by a crane. The transporting position is preferably tilted from the loading position for reducing the "effective width" of the cargo relative to the road surface, railway bed or waterway.

The vehicles and fixtures of this invention help to transport over-sized cargo without significantly increasing restrictions or tariffs during transport. Width reductions of about two feet can be provided to maximize the square footage of the load. The preferred fixtures of this invention are designed to rotate from a horizontal position to about 30°–50° from horizontal in a stable controlled manner so as to not upset the hauling vehicle. These fixtures are ideally suited for the transportation of pre-cast concrete double-T's, prefabricated trailers, over-sized I-beams and other beams, and manufactured housing.

In more detailed embodiments of this invention, the fixture can include a swinging arm having a pivot point which approximates the center of gravity for the object being transported. This permits the object to be rotated manually without heavy equipment from a horizontal loading position to an approximately 30°–50° transporting position. Preferred fixtures can also be equipped with adjustable boots and bolt plates for varying the height and width of the fixture. Cost savings per hauling can range from about $650 to over $850.

BRIEF DESCRIPTION OF THE DRAWINGS

The accompanying drawings illustrate preferred embodiments of the invention according to the practical application of the principles thereof, and in which.

DETAILED DESCRIPTION OF THE INVENTION

Figure 1:
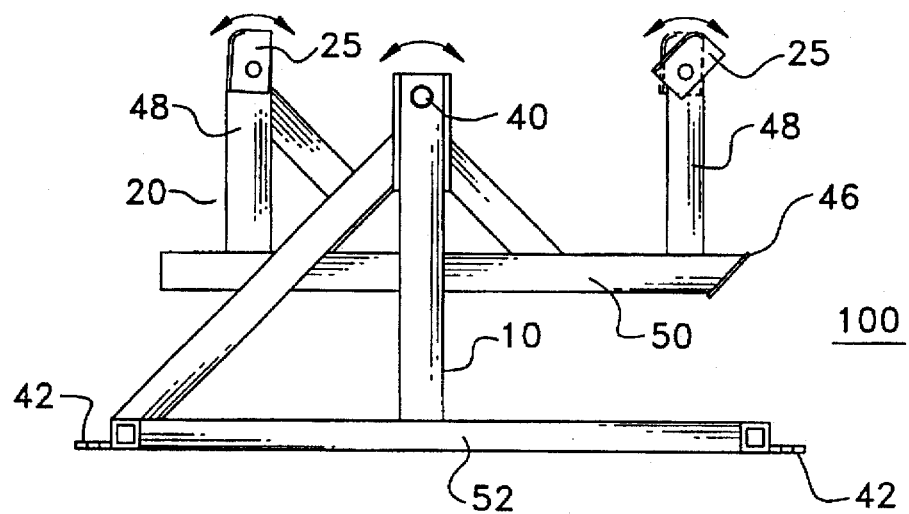
FIG. 1: is a rear elevation view of a preferred loading fixture of this invention in a loading position.
Figure 2:
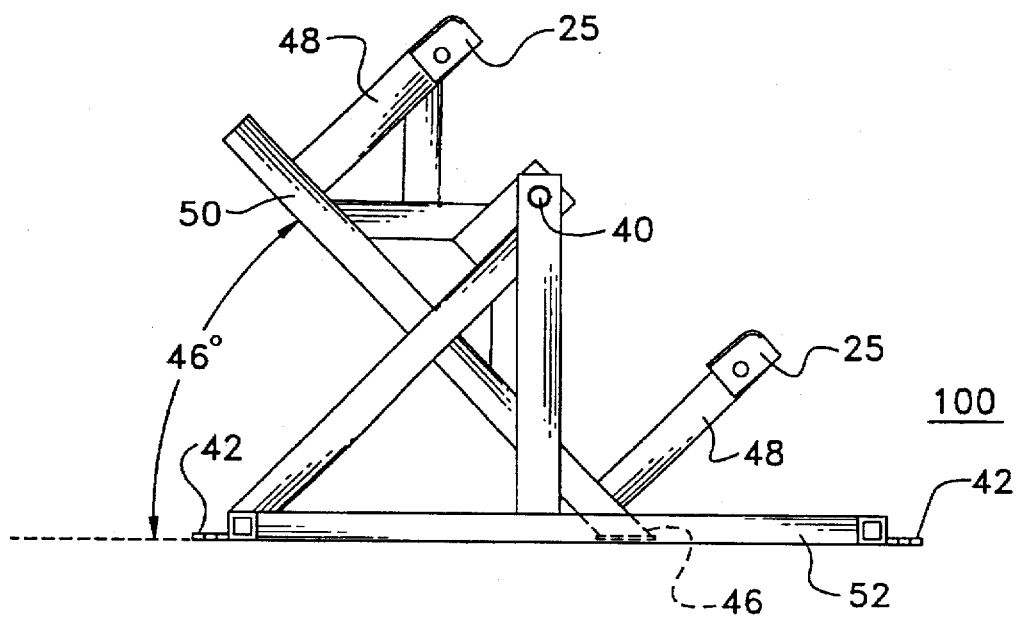
FIG. 2: is a rear elevation view of the loading fixture of FIG. 1 in a transporting position.

Loading fixtures, methods for their use and vehicles containing such fixtures are provided by this invention. The present concept is to safely support large bulky items during transport with a minimum of travel restrictions. The preferred fixture includes a novel rotating mechanism for helping to minimize the "effective width" of the item, especially during its passage over regulated roads. As used herein, the term "effective width" is the widest distance of the cargo as measured transversely from the direction of travel by a pair of imaginary parallel planes drawn perpendicularly from the roadway, waterway or railroad bed surface.

With reference to the figures and particularly to FIGS. 1–4 thereof, there is shown a preferred loading fixture 100 having a support arm 20 swivelly mounted to a support frame 10. The support frame 10 and arm 20 are desirably produced from tubular low carbon steel bars which are cut to size and then welded together. The support arm 20 can include a horizontal arm member 50 having a pair of transverse ends. Located at each of these transverse ends are vertical arm members 48 which form a large "W"-like swinging trapeze-like structure. At the approximate center of the "W" is a pipe and pin assembly 40 for supporting the support arm 20 in a preferred horizontal loading position with the support frame 10. Ideally, in this position, the bottom of the support arm is substantially parallel with the base 52 of the support frame 10, although this is not required.

The support arm 20 is designed to rotate in at least one direction. Upon traversing its full rotation to a transporting position, stop 46 will contact the bed of the trailer 200. This position can be about 30°–50°, and preferably is about 46° from horizontal for enabling large objects, such as a double-T 300, to display a smaller effective width.

In this way, large cargo can be received by the vertical arm members 48 of the support arm. This invention further provides rotating boots 25, swivally mounted to the vertical arm members 48, which help to more readily adjust the weight of large cargo, avoid binding, and help to focus the center of gravity of the cargo to the area of the central pin 40 so that it can be rotated manually without heavy equipment. While this is not a requirement, it can greatly reduce the cost of loading and unloading such cargo.

In another feature of the preferred embodiment, a safety pin coupling (not shown) is provided along one of the inclined posts of the support frame 10. The safety pin coupling can include, for example, a pair of tabs having apertures therethrough. One tab can be welded to an inclined post of the support frame 10 and another is welded to the lower surface of the horizontal arm member 50, for example. Upon tilting the arm 20 to the second transporting position, the holes in these tabs can be aligned to enable a locking pin to be disposed therethrough to fix the arm 20 in the second transporting position during vehicle motion.

In yet a further improvement of this invention, a pair of bolting plates 42 can be provided laterally from the edges of the base 52 of the support frame 10. These bolting plates 42 can have a series of holes therethrough for enabling attachment, and in the case of slotted or oval openings, selective width adjustment for accommodating different size trailers 200.

Figure 3:
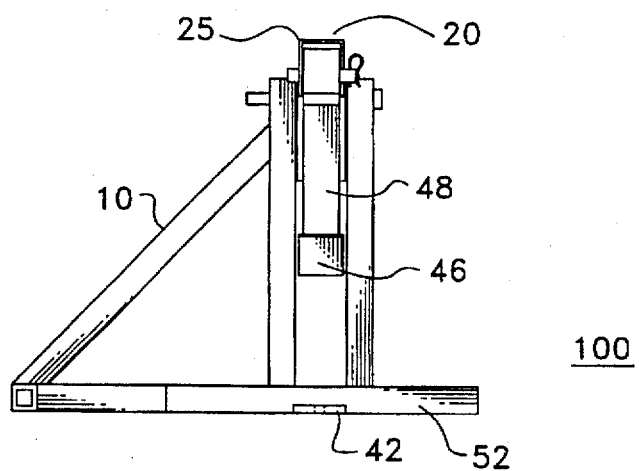
FIG. 3: is a side plan view of the loading fixture of FIG. 1.
Figure 4:
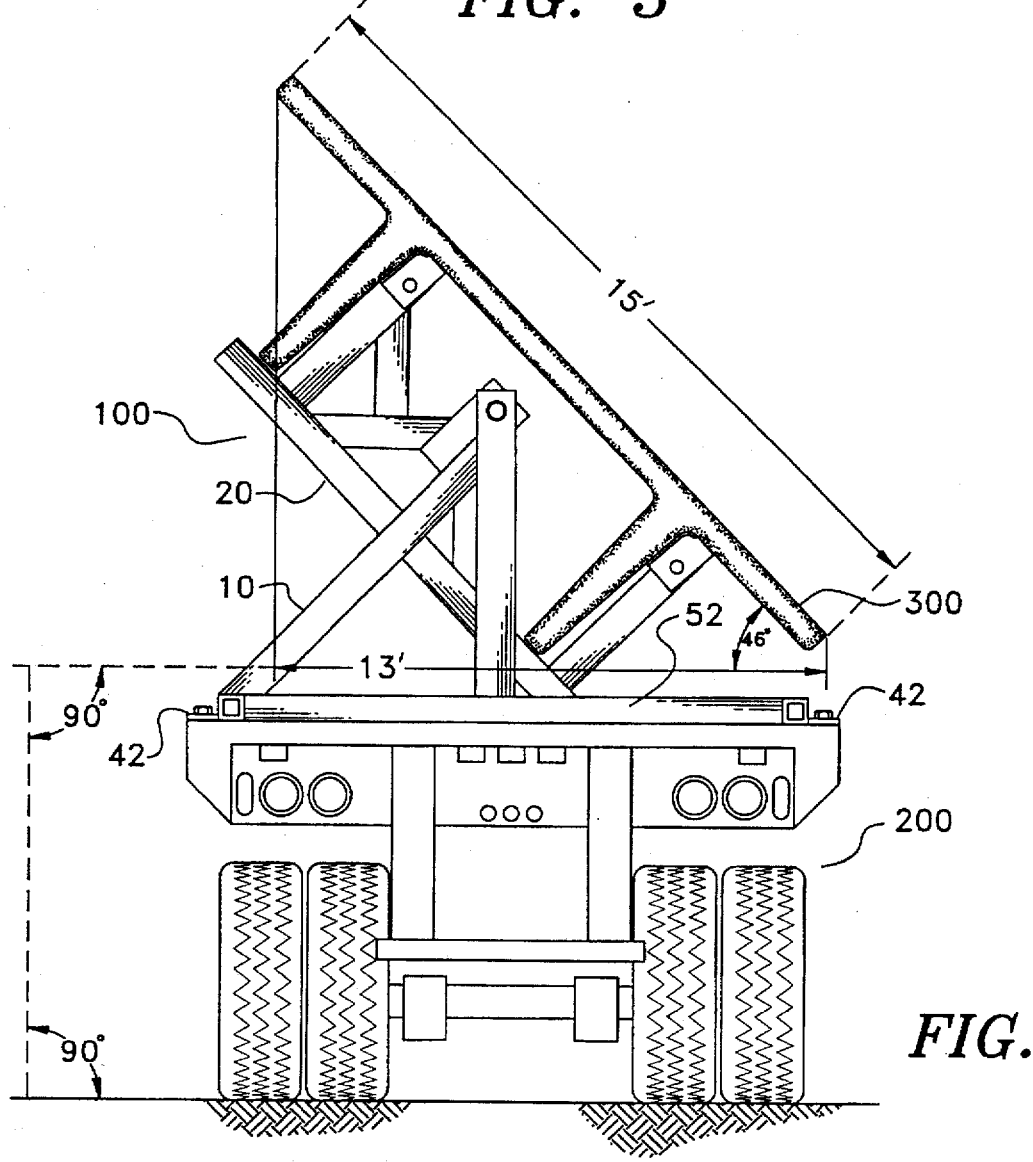
FIG. 4: is a rear plan view of the loading fixture of FIG. 1 mounted to the bedframe of a trailer.

As shown in FIG. 3, a double-T 300 can be supported at approximately 46° without tipping a trailer while simultaneously reducing a 15' effective length to about 13'. It is further noted that the center of gravity for the double-T does not significantly vary from the location of the pin 40 even when the double-T is rotated from the first loading position (0°) to the second transporting position (46°). This encourages stability and reduces the amount of force necessary to tilt the cargo between positions.

From the foregoing, it can be realized that this invention provides improved methods for transporting large bulky items such as I-beams, double-T's and prefabricated housing units over water or land. The preferred fixtures of this invention delicately balance these large objects by focusing the center of gravity in a central portion of the fixture even when the large heavy object is being rotated. The cost savings of reducing the "effective width" of such cargo is significant and the cargo can be delivered to construction workers without significantly delaying the beginning of their work day. Although various embodiments have been illustrated, this is for the purpose of describing, but not limiting the invention. Various modification, which will become apparent to one skilled in the art, are within the scope of this invention described in the attached claims.

We claim:

1. A hauling vehicle for transporting large, bulky cargo over a surface, said vehicle having a plurality of wheels transversely mounted to at least one axle and a bed frame; said bed frame comprising a loading fixture, including a support frame, and an arm swivelly mounted to said support frame, said arm disposed to contact and rotate said cargo from a first loading position to a second transporting position tilted from said loading position for reducing an effective width of said cargo relative to said road surface, wherein said arm is mounted to said support frame by a pin disposed through an aperture in said arm and said pin is located at about a center of gravity of said cargo.

2. The hauling vehicle of claim 1 wherein said arm is balanced in a substantially horizontal position when in said first loading position.

3. The hauling vehicle of claim 2 wherein said vehicle comprises a trailer.

4. A hauling vehicle for transporting large, bulky cargo over a surface, said vehicle having a plurality of wheels transversely mounted to at least one axle and a bed frame; said bed frame comprising a loading fixture, including a support frame, and an arm swivelly mounted to said support frame, said arm disposed to contact and rotate said cargo from a first loading position to a second transporting position tilted from said loading position for reducing an effective width of said cargo relative to said road surface wherein said arm comprises a first relatively horizontal member and a pair of relatively vertical members disposed to extend from a pair of transverse ends of said horizontal member and said vertical members comprise a rotating boot for facilitating the loading of said cargo.

5. A loading fixture suitable for transporting large, bulky cargo on a trailer, boat or railway, comprising a support frame and an arm swivelly mounted to said support frame, said arm disposed to contact and rotate said cargo from a first loading position to a second transporting position tilted from said loading position for reducing the effective width of said cargo relative to a surface, wherein said arm is swivelly mounted to said support frame by a pin, said pin disposed at approximately the center of gravity of said cargo.

6. The loading fixture of claim 5, wherein said first loading position is substantially parallel with a road surface.

7. The loading fixture of claim 6 wherein said transporting position represents an angle of about 30–50 degrees from said first loading position.

8. The loading fixture of claim 5 further comprising a trailer having a plurality of wheels transversely mounted to at least one axle; and a bedframe.

9. The loading fixture of claim 8 wherein said support frame is mounted to said trailer by a pair of substantially parallel bolt plates having slotted apertures therethrough.

10. The loading fixture of claim 5 wherein said arm comprises a horizontal member and a pair of vertical members extending from a pair of transverse ends of said horizontal member, said horizontal member mounted to said support frame by a centrally disposed pin so as to present said horizontal arm in a first horizontal position.

11. The loading fixture of claim 10 wherein said horizontal member further comprises a mechanical stop located at one of its transverse ends for limiting the degree of rotation of said arm.

12. The loading fixture of claim 10 wherein said support frame comprises a welded steel construction extending in at least two directions.

13. A loading fixture suitable for transporting large, bulky cargo on a trailer, boat or railway, comprising a support frame and an arm swivelly mounted to said support frame, said arm disposed to contact and rotate said cargo from a first loading position to a second transporting position tilted from said loading position for reducing the effective width of said cargo relative to a surface, wherein said arm comprises a horizontal member and a pair of vertical members extending from a pair of transverse ends of said horizontal member, said horizontal member mounted to said support frame by a centrally disposed pin so as to present said horizontal arm in a first horizontal position, wherein each of said vertical members comprise a rotating boot disposed on a vertical end portion thereof.

14. A method of transporting large, bulky cargo over a road surface, comprising providing a loading fixture including a support frame and an arm swivelly mounted to said support frame, said arm disposed to contact and rotate said cargo; loading said cargo onto said loading fixture in a first loading position; rotating said arm of said loading fixture from said first loading position to a second transporting position tilted from said loading position for reducing an effective width of said cargo relative to a road surface said arm being swivelly mounted to a pin, said pin being located at about a center of gravity region of said bulky cargo.

* * * * *